United States Patent [19]
Dotson et al.

[11] Patent Number: 5,547,011
[45] Date of Patent: Aug. 20, 1996

[54] WINDOW SCREEN APPARATUS

[75] Inventors: Cynthia Dotson; Danny George, both of Pennsboro, W. Va.

[73] Assignee: SLI, Inc., Wilmington, Del.

[21] Appl. No.: 186,686

[22] Filed: Jan. 25, 1994

[51] Int. Cl.⁶ .................................. A47G 5/00; E06B 9/24
[52] U.S. Cl. .................... 160/381; 403/402; 52/656.9; 160/371
[58] Field of Search ................................ 160/381, 380, 160/379, 371, 377; 52/204.57, 204.58, 656.9; 403/382, 402, 403; 248/903

[56] References Cited

U.S. PATENT DOCUMENTS

| | | | |
|---|---|---|---|
| 514,654 | of/1894 | Higgin . | |
| 724,682 | 4/1903 | Eastman . | |
| 1,038,367 | 9/1912 | Henry . | |
| 1,178,219 | 4/1916 | Cramer . | |
| 1,187,402 | 6/1916 | Traut . | |
| 1,260,589 | 3/1918 | Steger . | |
| 1,824,897 | 4/1930 | Johnson . | |
| 2,204,761 | 4/1939 | Lang | 156/14 |
| 2,291,726 | 8/1942 | Kaufmann | 189/76 |
| 2,585,471 | 2/1952 | Kammerer | 189/75 |
| 4,284,299 | 8/1981 | Kelly | 292/87 |
| 4,502,260 | 3/1985 | Machler | 52/656 |
| 4,570,406 | 2/1986 | DiFazio | 52/656 |

FOREIGN PATENT DOCUMENTS 2196677  5/1988  United Kingdom ................... 160/371

*Primary Examiner*—Leslie A. Braun
*Assistant Examiner*—Anita M. King
*Attorney, Agent, or Firm*—Cesari and McKenna

[57] ABSTRACT

A window screen frame includes at least one corner key which has, as an integral component, a stop that prevents the screen frame from penetrating too deeply into tracks in a window jamb. The corner key is preferably molded plastic and includes two legs, each supporting a raised member. The legs meet at an angle to form the corner and the raised members form the stop. In a preferred embodiment, the raised members meet at the corner to form a corner-shaped stop. One or more of the corner keys may also include integral handles, for moving the frame along tracks in the window jamb. The corner keys may further include retreats for receiving locking pins. The locking pins extend through the window frame and into the retreats to retain the window screen frame in a desired position. A window screen frame including at least one of these corner keys also includes frame segments that mate with the corner key. These frame segments do not include stops, and are thus less complex to manufacture than frame segments which include segment-long stops as integral components.

34 Claims, 6 Drawing Sheets

WINDOW SCREEN APPARATUS

FIELD OF THE INVENTION

This invention relates generally to window screen assemblies.

BACKGROUND OF THE INVENTION

A window screen consists of mesh, or screening, supported by a lightweight rectangular frame. The frame includes four essentially straight segments, i.e., the top, the bottom, and the left and right sides, which are connected at adjacent ends to form the corners of the frame. The ends of the segments are either cut at forty-five degree angles and connected directly together to form ninety-degree corners, or the ends are cut to mate with "corner keys," which are corner-shaped connectors. Each corner key basically consists of two legs with their adjacent ends joined at a ninety degree angle to form a corner. The free ends of the legs fit within or over the adjacent ends of the frame segments, to connect these segments via the corner, at a ninety-degree angle.

The screen frame slides either vertically or horizontally along tracks on the outer edges of the window jambs. The screen does not fit tightly in the tracks, since the screen will ordinarily require replacing several times before the window requires replacing. Accordingly, the screen must be able to be readily removed from and installed in the tracks.

In prior known window screen assemblies the screen frames include on at least one side a segment stop, in the form of a narrow ridge. This ridge prevents the screen from penetrating too deeply into the track. Each ridge, which is offset from the outer edge of the segment, runs parallel to the edge, and extends the entire length of the segment. It thus essentially widens the segment, so that only the portion of the segment that is to the outside of the ridge rides within the track. The screen can then be shifted and removed, or withdrawn, from the tracks.

The frames must be lightweight and low cost to be competitively marketed. Including these segment-long ridges on the frame segments increases the weight of the segments and the amount of raw material used to make them. To minimize the weight and the materials used, the ridges must be quite narrow. However, manufacturing segments with these narrow ridges requires custom designed, and thus, expensive machinery, which adds to the cost of manufacture.

After the frame segments are manufactured, they are assembled to form the frame. Then, handles used to move the screen along the tracks are attached, either to the side or bottom segments of the frame. This assembly process is labor intensive, which adds to the cost of the frame. Further, holes for screws or other cut-outs for attaching the handles to the frames must be included on the frame segments, which complicates the manufacturing process. Alternatively, the handles may be incorporated into an extruded frame segment, which adds to the cost of producing the segment, and thus, the cost of the frame.

What is needed is a window screen frame that is simpler and less expensive to manufacture than the prior, known frames.

SUMMARY OF THE INVENTION

The invention is an improved window screen frame that includes at least one corner key with an integral stop. The two legs of the corner key support raised members that extend approximately half the length of the legs and are spaced from and run parallel to the outer edges of the legs. Preferably, members meet where the legs join, to form a corner-shaped stop.

The stop is relatively small, and does not add much weight to the frame. Accordingly, it need not be as narrow as the segment-long ridges of prior systems. The stop is readily incorporated into the corner key, which is preferably molded plastic, and thus, one-piece and easy to manufacture. These corner-shaped stops replace the segment-long ridges used in prior frames. The frame segments currently used are thus easier and less expensive to manufacture than the prior segments.

In an alternative embodiment, one or more of the corner keys also includes an integral handle, which is molded into the inside edge of the corner key. These corner keys eliminate the separate handles of prior assemblies. Accordingly, they significantly reduce the time required to assemble a frame, and thus, the associated costs. They are also easier and less expensive to manufacture than extruded frame segments with integral handles. These corner keys may be installed on two of the four corners, depending on whether the screen moves vertically or horizontally.

In a second alternative embodiment, one or more of the corner keys also includes retreats for pins used to lock the screen against movement. The pins extend from the interior, through the window frame and into the retreats. Once the pins are in place in the retreats, the screen can not be moved, and thus, cannot be removed from the tracks. The retreats are readily incorporated into the corner keys. In prior systems, the retreats must be cut into the frame segments, which complicates their manufacture. A corner key constructed in accordance with this embodiment may include a stop, a handle or both.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
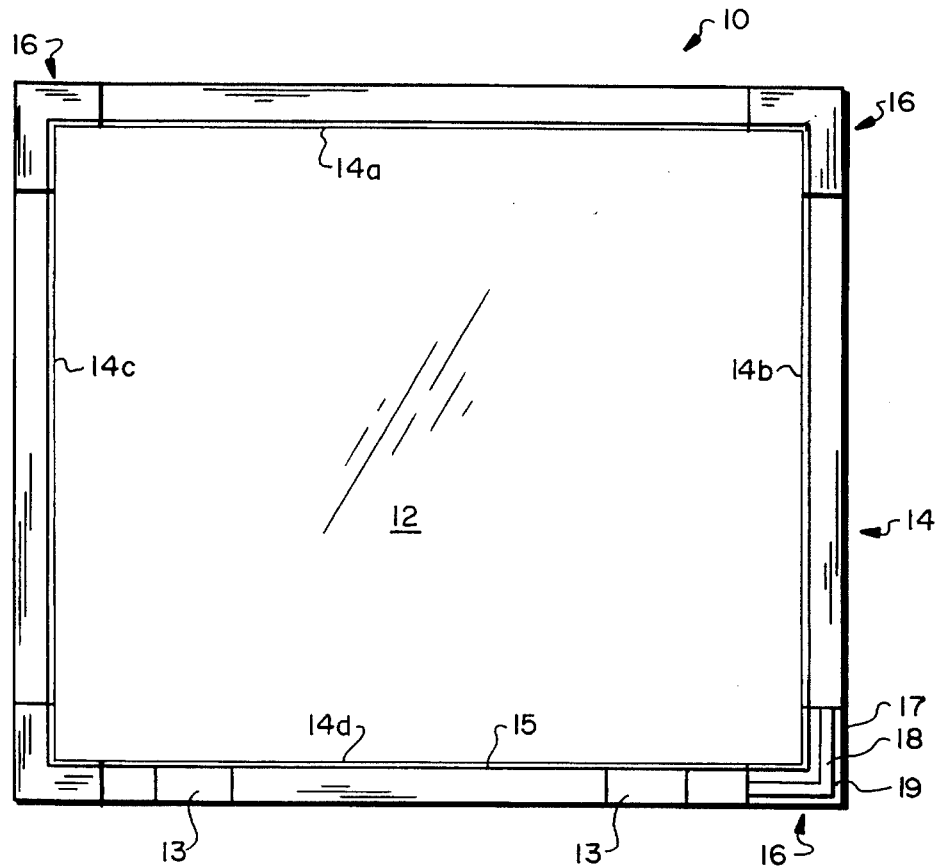
FIG. 1 depicts a window screen frame constructed in accordance with a first embodiment of the invention.

FIG. 1 depicts an exterior side of a window screen 10 constructed in accordance with a first embodiment of the invention. The window screen 10 includes a frame 14 that consists of four frame segments 14a–d and interconnecting corner keys 16. The frame 10 supports screening 12 that mounts on the frame in a conventional manner. A bottom segment 14d of the frame includes installed handles 13, that are used to raise and lower the screen along vertical tracks of an associated window frame (not shown). The handles 13 face the interior, and thus, only the handle attachment mechanism is shown in the drawing. If the screen moves horizontally along the tracks in the window frame, the handles 13 are installed instead on frame segment 14b.

At least one of the corner keys support a corner-shaped stop 18, which prevents the frame from riding too deeply in the vertical or horizontal tracks. The stop 18 is spaced from the outer edges 17 of the key 16, leaving a relatively narrow outer region 19. It is this outer region 19 that fits, and thus rides, within the track. The stop 18, which is discussed in more detail with reference to FIG. 2 below, eliminates the need for the segment-long ridges included on the frame segments used in known prior frames. Accordingly, the frame segments 14 used in the current frame are easier, and consequently less expensive, to manufacture that the frame segments used in the prior frames.

Figure 2:
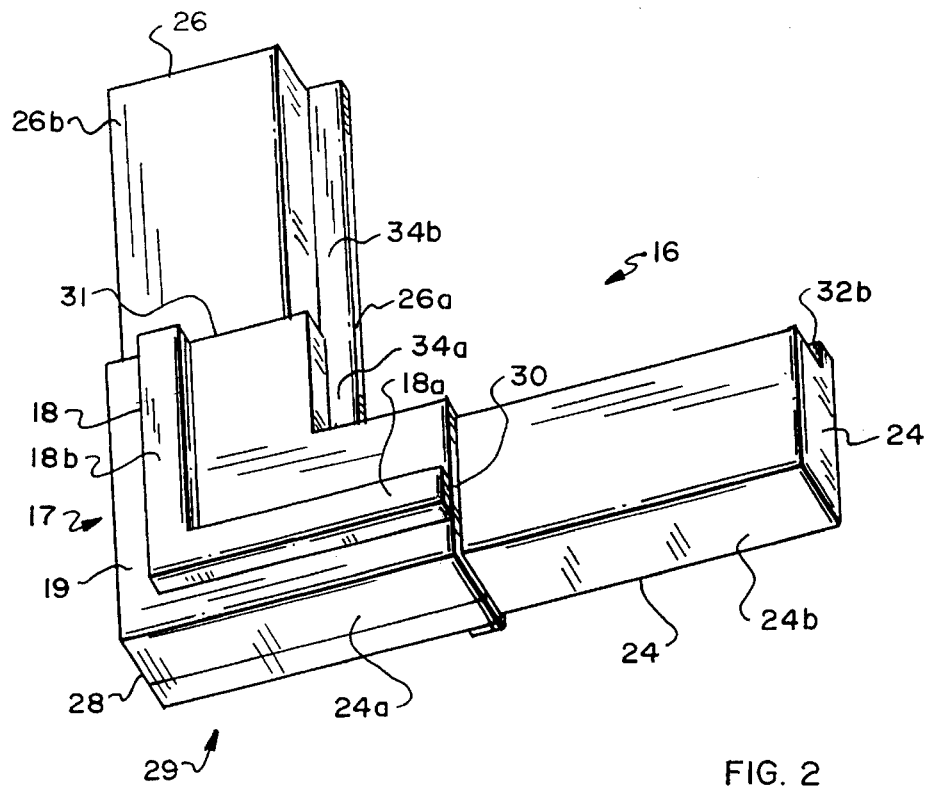
FIG. 2 depicts in more detail a corner key utilized in the frame of FIG. 1.

Referring now to FIG. 2, the corner key 16 which supports the stop 18 includes two legs 24 and 26 which meet at a ninety degree angle to form a corner 28. The legs 24 and 26, respectively, support raised members 18a and 18b which preferably also meet at a ninety degree angle to form the stop 18. The members 18a and 18b are spaced from the outer edges of the legs, and thus, define the outer region 19.

The legs 24 and 26 each consist respectively of an upper section 24a, 26a and a lower section 24b, 26b. The upper sections 24a and 26a, which meet to form the corner 28 and support the stop 18, are thicker than the lower sections 24b and 26b and together form a corner section 29. Accordingly, on each leg there is a slight discontinuity, or edge 30 and 31, respectively, where the upper and lower sections 24a–b and 26a–b meet. The thinner lower sections 24b and 26b slide into the ends of the adjacent segments, until the segments are flush with the edges 30 and 31 of the corner section 29. The segments and the corner section then form an essentially continuous section of the frame 14 (FIG. 1).

The upper sections 24a and 26a of legs 24 and 26 are shaped to mate with the frame segments 14. They thus include U-shaped troughs 32a and 34a, which align with troughs 15 on the segments 14 (FIG. 1). These troughs facilitate the mounting of the screening 12 to the frame 14. As depicted in the drawing, L-shaped troughs 32b and 34b may extend the lengths of the lower sections 24b and 26b of the legs 24 and 26, for ease of manufacture.

Referring still to FIG. 2, each of the members 18a and 18b of the stop 18 extends approximately one-half the length of the associated leg 24 and 26. The legs are approximately 2 inches long, and members are thus about one inch long. The stop 18 is so small, when compared to the size of the frame 14 (FIG. 1), that it may be relatively wide without significantly increasing the weight of the frame or the amount of raw materials used in making the frame. The stop is easily incorporated into the corner key, which is preferably made of molded plastic and one-piece. Accordingly, the key, with the integral stop, can be inexpensively manufactured.

Figure 3A:
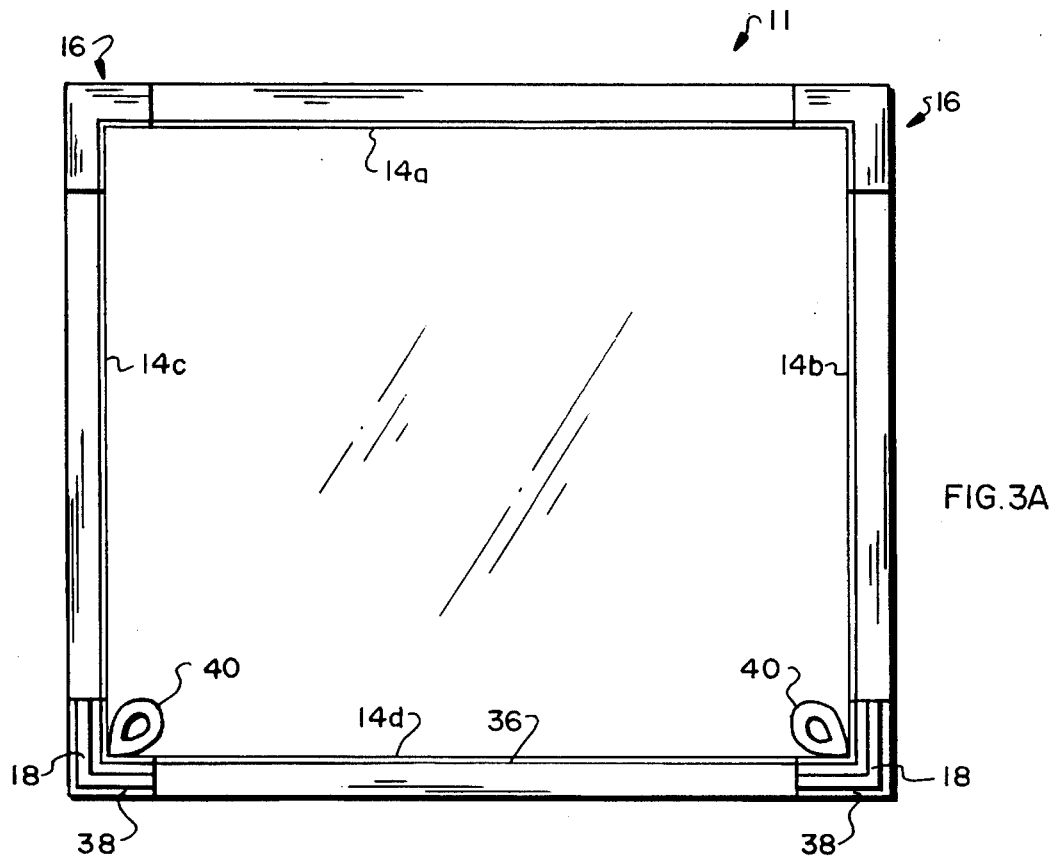
FIGS. 3A and 3B each depict a window screen frame constructed in accordance with an alternative embodiment of the invention, with the frame in FIG. 3a constructed for vertical movement and the frame in Fig. 3b constructed for horizontal movement.
Figure 3B:
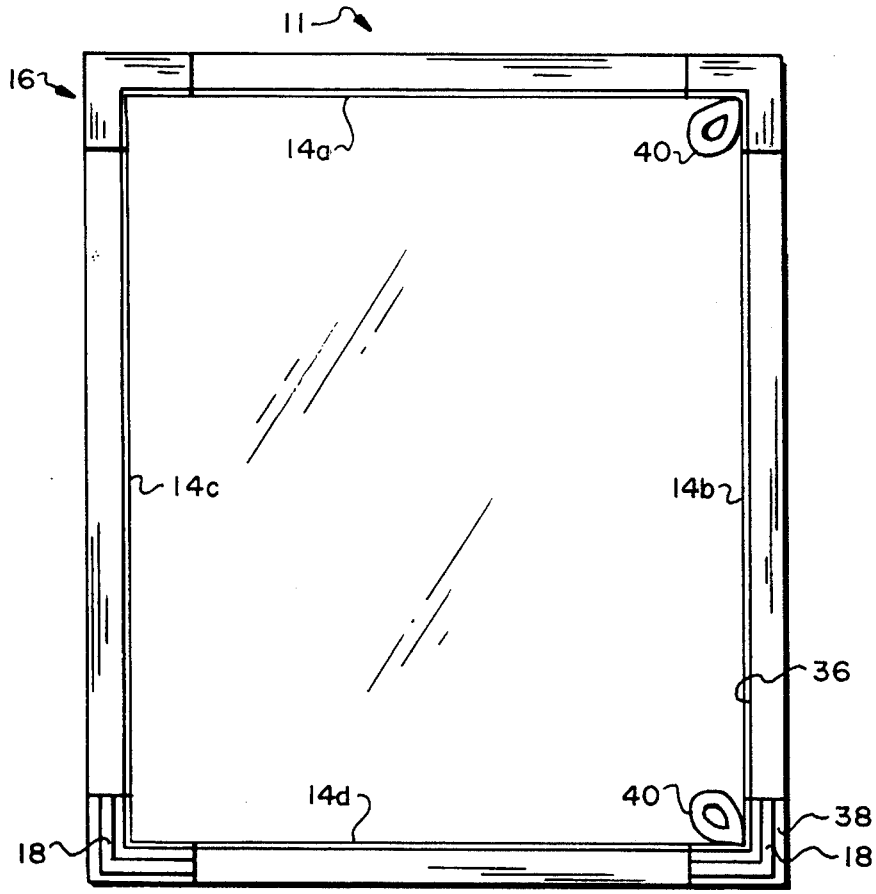

FIGS. 3A and 3B illustrate an alternative embodiment 11 of the current invention. FIG. 3A depicts a window screen frame 11 that includes the four frame segments 14a–d and the two corner keys 16 that connect the top 14a to the two sides 14b–c, as shown also in FIG. 1. In addition the frame 11 includes two corner keys 38 with integral handles 40, that connect the two side segments 14b–c to the bottom frame segment 14d. The handles 40 can be used to slide the screen frame vertically along tracks in the window jamb (not shown). One of these corner keys 38 also includes the integral stop 18 discussed above.

FIG. 3B depicts the window screen frame 11 configured for sliding horizontally along the tracks. Accordingly, the two corner keys 38 with integral handles 40 connect the side 14b to the top and bottom sections 14a and 14d of the frame. The two corner keys 16 without handles connect the opposite side 14c to the top and bottom sections.

Figure 4:
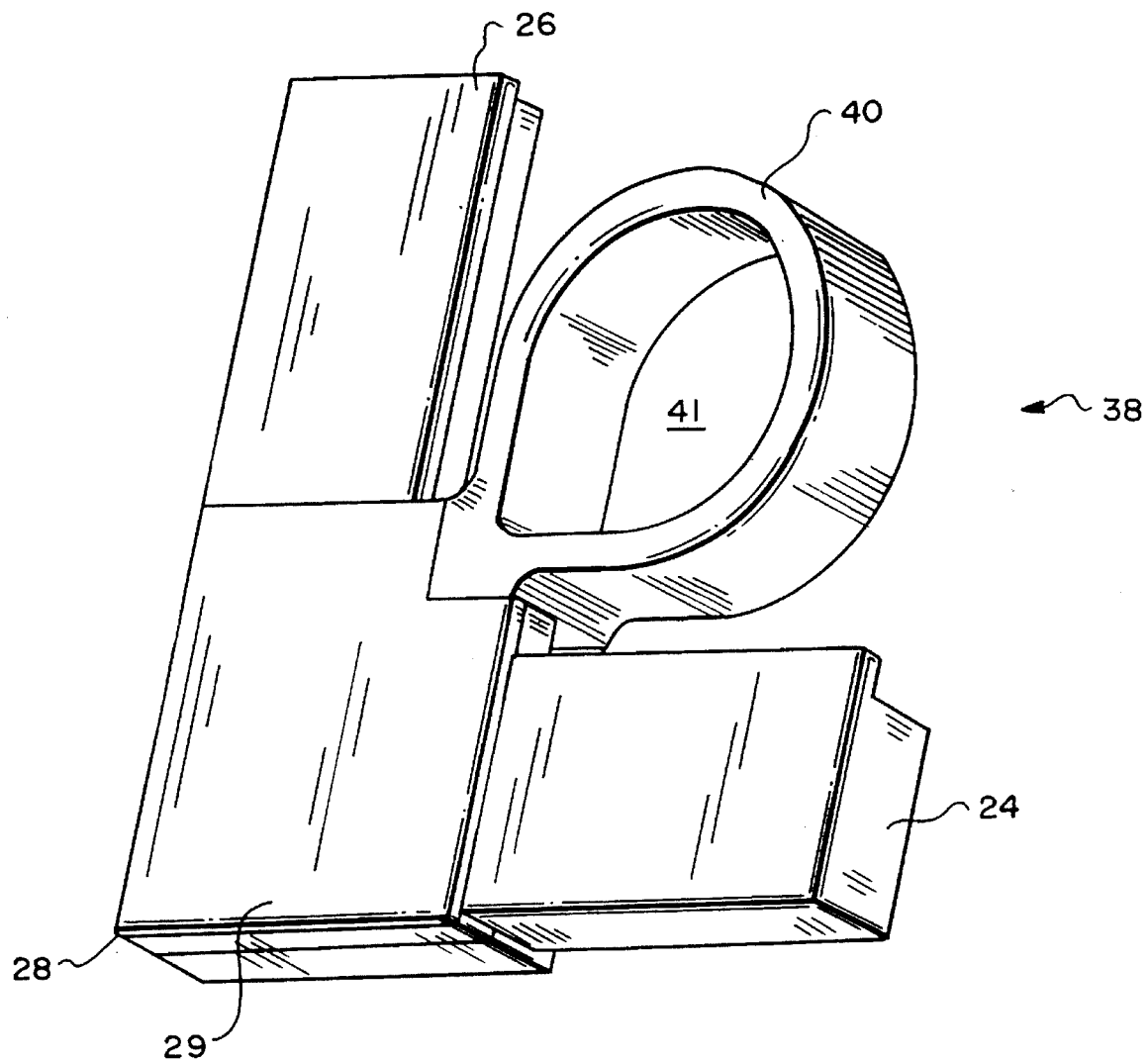
FIG. 4 depicts in more detail a corner key utilized in the frames of FIGS. 3a and 3b.

FIG. 4 depicts the corner key 38 in more detail. In this drawing the interior side of the key is shown. Accordingly the stop 18, which is on the exterior side of at least one of these keys, is not shown. The corner key 38 includes the two legs 24 and 26 which meet to form the corner section 29. In addition to the stop, the corner section 29 supports the handle 40, which extends inwardly therefrom. The handle 40 is circular in the drawing with a finger-sized cavity 41. The handle may be any shape, such as, for example, square with one of its corners pointing toward the corner 28. The handle 40 may be open as depicted in FIG. 4 or it may be closed with an end wall (not shown) on the exterior side, to protect the screening 12 (FIG. 1) against tearing caused by fingers poking through the cavity. A trough between the handle 40 and the interior edges of the corner section 29, which is hidden from view in the drawing, connects with the troughs 15 on the frame segments 14a–d (FIGS. 3 and 3b). These troughs facilitate the mounting of the screening 12 to the frame.

Assembling a frame 14 using the corner keys 38 eliminates the need to install separate handles. This reduces the time it takes to complete the frame assembly process, and thus, reduces the associated cost. Further, it simplifies the manufacturing process for the frame segments by eliminating therefrom the cut-outs associated with these separate handles.

Figure 5:
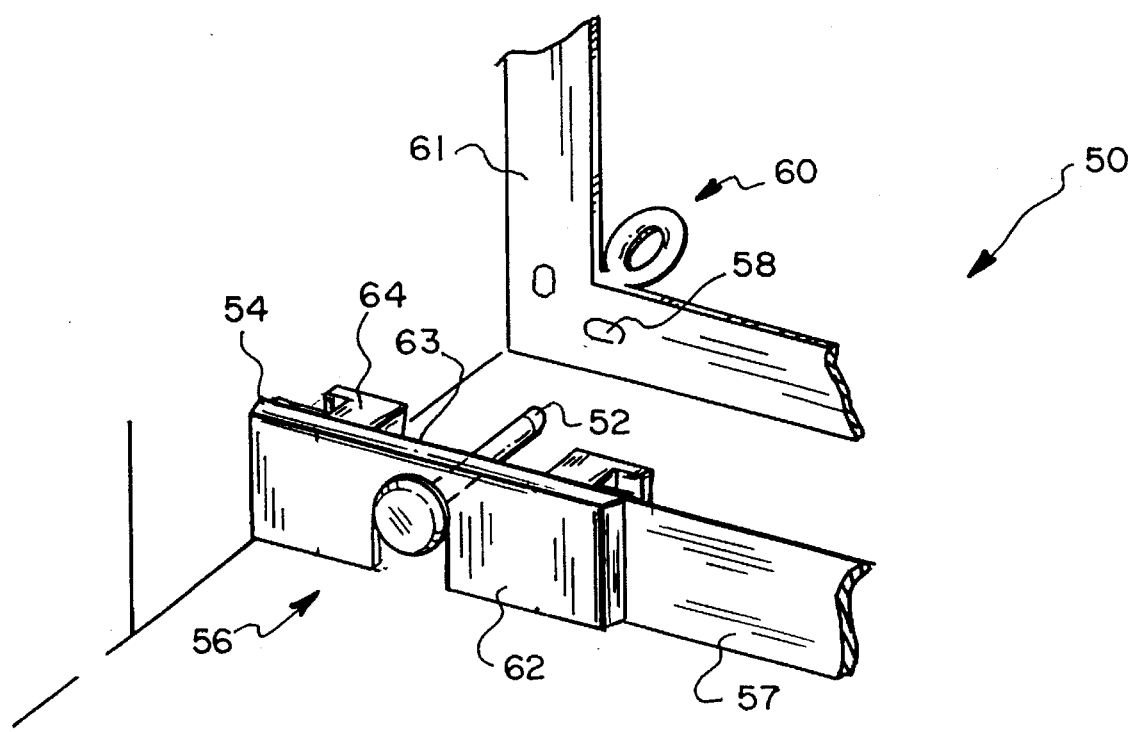
FIG. 5 depicts a window assembly which includes a window screen frame constructed in accordance with a second alternative embodiment.

FIG. 5 depicts a lower, left hand corner of a window assembly 50 constructed in accordance with a second alternative embodiment. This assembly includes a locking mechanism which consists of a locking pin 52 that extends through a window frame 54 and a housing 56 supported by the frame 54. The pin 52 engages a retreat 58 in a corner key 60 of a window screen frame 61. When the pin 52 enters the retreat 58, the pin prevents the window screen frame 61 from being moved in either the horizontal or vertical direction. The corner key 60 is depicted in more detail in FIG. 6.

Figure 7A:
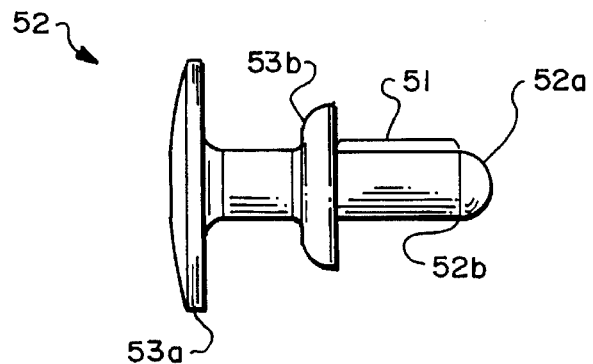
FIGS. 7A and 7B depict in more detail a pin and a housing, which are parts of a locking mechanism included in the window assembly of FIG. 6.
Figure 7B:
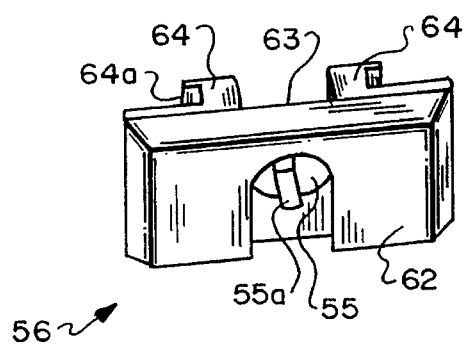

Referring also to FIGS. 7A and 7B, the locking pin 52 includes on the end 52a that engages the retreat 58 a protrusion 52b and along its length a ridge 51. An opening 55 in the housing 56 through which the pin 52 moves, as it is withdrawn from the retreat 58 and later inserted into the retreat, is shaped to receive the ridge 51 and the protrusion 52b. The opening 55 thus includes a detent 55a, which receives the ridge 51 and maintains the pin in proper alignment. As the pin 52 is withdrawn, the protrusion 52b compresses slightly and ultimately hits an inner wall of the housing 56, which prevents further withdrawal of the pin. When the pin 52 is fully withdrawn from the retreat 58, the opening 55 holds the pin, by friction, to prevent it from inadvertently re-entering the retreat 58. The opposite end of the locking pin 52 supports a handle 53a that is excessible from the interior side of the window frame 54 and a stop 53b, which prevents the pin 52 from sliding too deeply into the retreat 58, and thus, out of the reach of the user.

The housing 56 includes an interior face 62, an exterior face 63 and two legs 64 that extend outwardly therefrom. The legs are shaped to slide into a detent (not shown) in the window frame 54, such that the frame rests against an indent 64a in each of the legs. In a preferred embodiment, the housing 56 is supported by a wall 57, which is the interior wall of the track for the screen.

Including the retreats 58 in the corner keys 60 avoids having to include them in the frame segments 14. The retreats are easily incorporated into the keys, which are preferably made of molded plastic, and may not be as easily incorporated into the frame segments. The corner keys may include two retreats as depicted in FIG. 6, so that the keys can be used in any corner of the frame.

Figure 6:
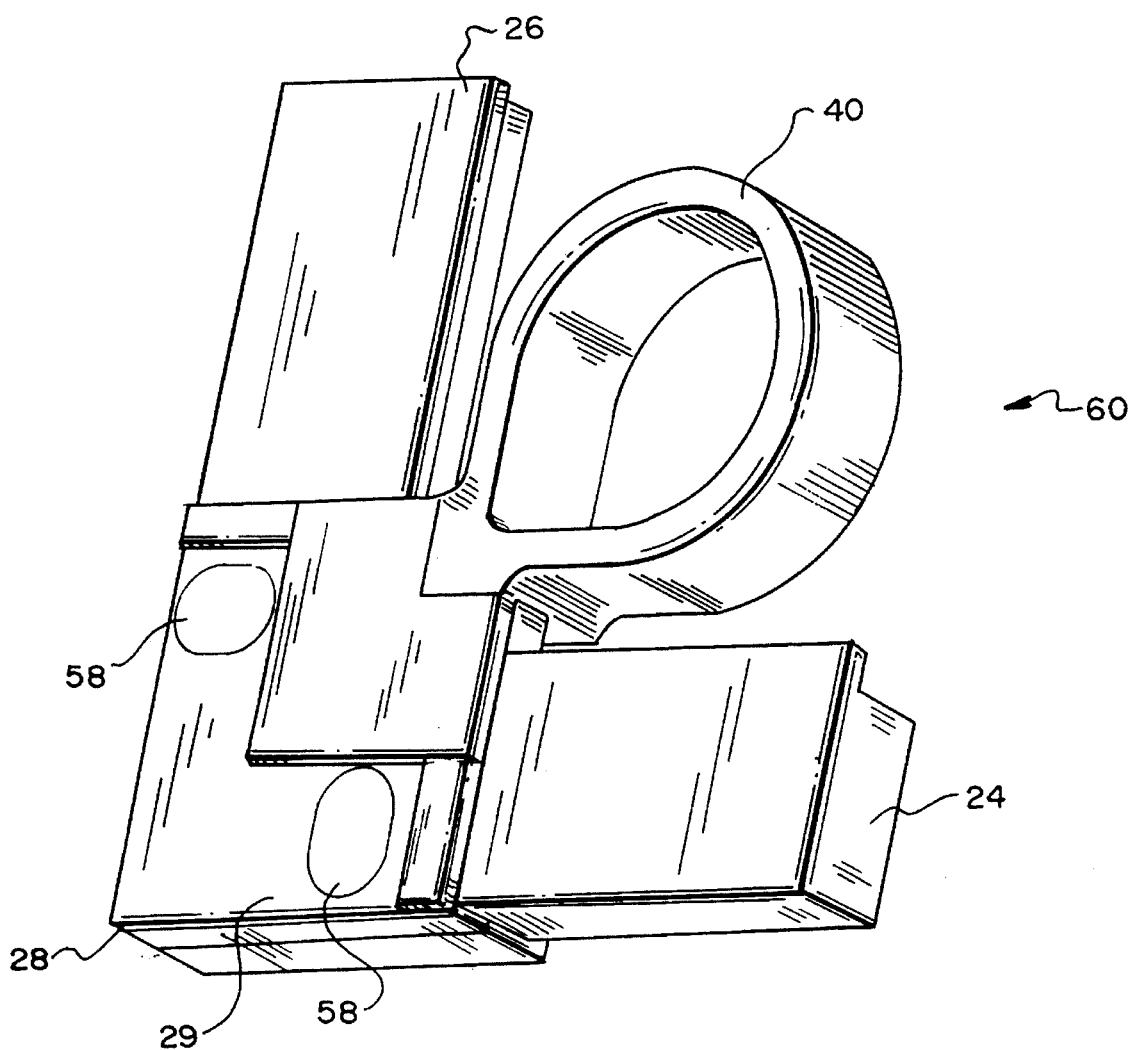
FIG. 6 depicts a corner key used in the second alternative embodiment.
Figure 8:
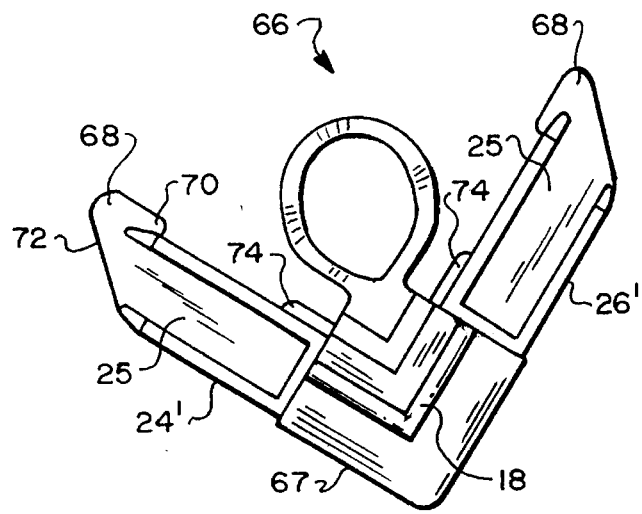
FIG. 8 depicts an alternative embodiment of the corner key of Fig. 6.

FIG. 8 illustrates an alternative embodiment of the corner key 60 depicted in FIG. 6. The key 66 depicted in FIG. 8 has legs 24' and 26' which have U-shaped cross sections. The opening 25 in the legs 24' and 26' face the exterior when the key 66 is installed in an assembled screen frame. Each of the legs 24' and 26' include a shaped end 68, which inhibits the associated leg from pulling out of the frame segment into which the leg is installed. These shaped ends 68 are essentially flat, with a straight side that forms a tab 70 and an angled, elongated side 72. The tab 70 extends outwardly from the associated leg 24' or 26', to widen the end of the leg and prevent it from pulling out of the frame segment 14 into which it is inserted. Each of the legs 24' and 26' also includes a tab 74, which is proximate to tile corner section 67 of the corner key 66. This tab 74 widens the portion of tile leg that is proximate to the end of the frame segment into which the leg is installed. This tab 74 thus inhibits the frame segment from moving away from the corner section 67. This configuration of the leg, which reduces the materials used in manufacturing the corner keys, may be used in any of the keys 16, 38 and 60 discussed above.

Each of these corner keys is relatively easy to manufacture. These keys include, as integral components, handles and/or stops. The frame segments used in conjunction with these corner keys thus need not include the segment-long stops required in prior systems. Accordingly, these segments are easily and inexpensively manufactured. Also, handles need not be attached to the frame segments to complete the assembly of a window screen frame, and the window screen frame that includes these corner keys can be more quickly, easily and inexpensively assembled than prior known frames.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A window screen frame for supporting screening, the frame adapted to ride within tracks of a window jamb said window screen frame including:

A. four frame segments forming a top, a bottom, a first side and a second side of the frame;
   B. corner keys interconnecting the frame segments and forming frame corners, at least one of the corner keys including a raised stop having first and second opposing side surfaces connected by an outer frame surface, the stop being positioned a predetermined distance from an outer edge of the key and substantially parallel to the track in which the frame moves, wherein one of said opposing sides of the stop prevents the frame from penetrating beyond the predetermined distance into the tracks.

2. The window screen frame of claim 1, wherein the corner key that includes the raised stop further includes a first leg that supports a first raised member and a second leg that supports a second raised member, the legs meeting at an angle to form the corner and the raised members meeting to form the stop, wherein the legs slideably attach to two frame segments and connect the segments, via the corner, at an angle.

3. The window screen frame of claim 2, wherein the raised members meet to form a corner-shaped stop.

4. The window screen frame of claim 1, wherein the corner key that includes the raised stop is one-piece and the stop is an integral component of the key.

5. The window screen frame of claim 4, wherein at least one of the corner keys further includes an integral handle.

6. A window screen frame of claim 1, wherein the corner keys comprise:

i. a first set of corner keys for interconnecting the two ends of one frame segment to one end of two other frame segments to form a first corner and a second corner, the corner keys of the first set each including a stop as an integral component thereof; and
   ii. a second set of corner keys for interconnecting the remaining ends of the two frame segments, respectively, to the two ends of the remaining frame segment to form a third corner and a fourth corner, corner keys of the second set including as integral components thereof stops and handles.

7. The window screen frame of claim 6, wherein a. the first set of corner keys interconnect the first and the second ends of the top segment and the first ends of the two side segments, and
   b. the second set of corner keys interconnect the first and the second ends of the bottom segment and the second ends of the two side segments.

8. The window screen frame of claim 6, wherein a. the first set of corner keys interconnect the first and the second ends of one of the side segments and the first ends of tile top and the bottom segments, and
   b. the second set of corner keys interconnect the first and tile second ends of tile opposite side segment to the second ends of the top and the bottom segments.

9. The window screen frame of claim 7, wherein the corner key of the first set that includes the stop further includes a first leg with a raised member and a second leg with a raised member that meet at an angle to form a corner section, the corner wherein the legs slideably attach to the frame segment forming the top and one of the segments forming either the first side or the second side of the frame to connect the top and the side segments, via the corner, at an angle.

10. The window screen frame of claim 7, wherein each corner key of the second set that includes the stop further include a first leg which engages the bottom and the first side segments, the first leg including a raised first member, and a second leg which engages the bottom and the second side segments, the second leg including a raised second member, the legs and raised members meeting at an angle to form a corner section and the stop, and the corner section further supporting the handle.

11. The window screen frame of claim 8, wherein the corner keys of the first set each include a first leg with a raised member and a second leg with a raised member that meet at an angle to form a corner section, wherein the legs slideably attach to the frame segment forming the side and one of the segments forming either the top or the bottom of the frame to connect the side segment to the top and the bottom segments, via the corner sections, at angles.

12. The window screen frame of claim 8, wherein the corner keys of the second set each include a first leg which engages a side segment and the bottom segment, the first leg including a raised first member, and a second leg which engages the side segment and the top segment, the second leg including a raised second member, the legs and raised members meeting at an angle to form a corner section and the stop, and the corner section further supporting the handle.

13. The window screen frame of claim 6, wherein the corner keys of the first set are each constructed as one piece and the corner key with the stop as an integral component of the corner section.

14. The window screen frame of claim 6, wherein the corner keys of the second set are each constructed as one piece with the stop and the handle as integral components of the corner section.

15. A window assembly for use with a window frame having tracks within which a window screen moves, the window assembly further including:
   A. a locking mechanism for preventing the screen from moving within the track, the locking mechanism including a plurality of pins adapted to extend through the window frame and engage the screen;
   B. A window screen having a frame with
      i. four frame segments forming a top, a bottom, a first side and a second side of the frame;
      ii. corner keys for interconnecting the frame segments and forming frame corners, at least one of the corner keys including a raised stop having first and second opposing side surfaces connected by an outer frame surface, the stop being positioned a predetermined distance from an outer edge of the key and substantially parallel to the track in which the frame moves, wherein one of said opposing sides of the stop prevents the frame from penetrating beyond the predetermined distance into the tracks, one or more of the corner keys further including one or more retreats for receiving one or more of the pins.

16. The window assembly of claim 15 wherein the locking mechanism further includes for each pin a housing supported by the window frame, the pin extending through the housing and the housing being shaped to retain the pin when the pin is withdrawn from the retreat, wherein the pin does not inadvertently engage the retreat.

17. The window assembly of claim 16 wherein each of the pins includes on one end a protrusion and each housing is shaped to receive the end with the protrusion and hold the end by friction, to prevent the pin from engaging the retreat.

18. The window assembly of claim 15 wherein one or more of the corner keys further include integral handles.

19. The window assembly of claim 15 wherein the bottom and the two side sections of the frame are interconnected with corner keys that include integral handles.

20. The window assembly of claim 15 wherein the top and two side sections of the frame are interconnected with corner keys that include integral handles.

21. The window assembly of claim 15 wherein one side segment and the top and the bottom segments are interconnected with corner keys that include integral handles.

22. The window assembly of claim 16, wherein the housing is adapted to be supported by an internal wall of a screen track in the window frame.

23. A corner key for use in a window assembly to join frame segments for form a frame, the corner key including:
   A. a first leg with a first end and a second end, the second end supporting a first raised member having first and second opposing side surfaces connected by an outer frame surface, the member being positioned a predetermined distance from an outer edge of the key and substantially parallel to the outer edge; and
   B. a second leg with a first end and a second end, the second end supporting a second raised member having first and second opposing side surfaces connected by an outer frame surface, the member being positioned the predetermined distance from the outer edge of the key and substantially parallel to the outer edge,
the second ends of the legs meeting at an angle to form a corner section with the raised members at an angle relative to one another to form a stop, wherein the first ends of the legs slideably engage two frame segments and connect the segments, via the corner section formed by the second ends, with the stop raised outwardly from the corner section
   wherein, when the corner key is included in an assembled frame, one of the opposing sides of one of the raised members prevents the frame from penetrating beyond the predetermined distance into a track in the window assembly.

24. The corner key of claim 23, wherein the raised members meet to form a corner-shaped stop.

25. The corner key of claim 24, wherein each of the legs includes at its second end an upper portion and at its first end a lower portion, the upper portion supporting the raised member and the lower portion engaging the frame segments with each end of each of the frame segments, respectively, sliding onto the lower portion of one of the legs and meeting the upper portion of the leg.

26. The corner key of claim 25, wherein the upper portions of the legs join to form a corner section.

27. The corner key of claim 23 further including an integral handle.

28. The corner key of claim 26, wherein the corner section supports an integral handle.

29. The corner key of claim 28, wherein the corner key is one-piece with the stop and handle as integral components.

30. The corner key of claim 25 wherein the lower portions of the legs have U-shaped cross sections.

31. The corner key of claim 30 wherein the lower portions of the legs include inwardly pointing tabs that retain the legs within the frame segments into which the legs are inserted.

32. A window assembly for use with a window frame having tracks within which a window screen moves, the window assembly further including:
   A. A window screen having a frame with
      i. four frame segments forming a top, a bottom, a first side and a second side of the frame;
      ii. corner keys for interconnecting the frame segments and forming frame corners, at least one of the corner keys including a raised stop, which is positioned a predetermined distance from an outer edge of the key, for preventing the frame from penetrating beyond the predetermined distance into the tracks, one or more of the corner keys further including one or more retreats for receiving one or more pins; and
   B. a locking mechanism for preventing the screen from moving within the tracks, the locking mechanism including
      i. a plurality of pins that extend through the window frame and engage the window screen, each pin including on one end a protrusion, and ii. for each pin a housing supported by the window frame, each housing being shaped to receive the end of the pin with the protrusion and hold the end by friction, to prevent the pin from engaging the retreat.

33. A corner key for use in a window assembly to join frame segments for form a frame, the corner key including first and second legs that each include an upper portion and a lower portion:

A. the upper portion of the first leg supporting a first raised member which is positioned a predetermined distance from an outer edge of the key; and B. the upper portion of the second leg supporting a second raised member which is positioned the predetermined distance from the outer edge of the key, C. the lower portions of the legs engaging the frame segments, the lower portions having U-shaped cross-sections and including inwardly pointing tabs that retain the legs within the frame segments into which the legs are inserted, the legs meeting at an angle with the upper portions forming a corner section and the raised members meeting at an angle relative to one another form a corner-shaped stop that extends outwardly from the corner section, wherein the lower portions of the legs slideably attach to two frame segments and connect the segments, via the corner section, at an angle.

34. The corner key of claim 33, wherein the inwardly pointing tab on each leg is proximate to the upper portion of the leg.

* * * * *